United States Patent [19]

Moisin

[11] Patent Number: 4,829,567
[45] Date of Patent: May 9, 1989

[54] LINE INTERFACE CIRCUIT

[75] Inventor: Mihail S. A. T. Moisin, Willowdale, Canada

[73] Assignee: Northern Telecom Limited, Montreal, Canada

[21] Appl. No.: 100,048

[22] Filed: Sep. 23, 1987

[51] Int. Cl.$^4$ .......................................... H04M 19/00
[52] U.S. Cl. ..................................... 379/413; 379/398; 379/405
[58] Field of Search ............... 379/405, 413, 345, 324, 379/398–400, 412

[56] References Cited

U.S. PATENT DOCUMENTS

| | | | |
|---|---|---|---|
| 3,035,122 | 5/1962 | Livingstone | 379/413 X |
| 4,322,586 | 3/1982 | Mein et al. | 379/413 X |
| 4,361,732 | 11/1982 | Wood | 379/398 |
| 4,476,350 | 10/1984 | Aull et al. | 379/413 X |
| 4,484,032 | 11/1984 | Rosenbaum | 379/345 |
| 4,514,595 | 4/1985 | Rosenbaum et al. | 379/400 X |
| 4,532,384 | 7/1985 | Keriakos et al. | 379/398 X |
| 4,539,438 | 9/1985 | Rosenbaum et al. | 379/413 X |
| 4,562,525 | 12/1985 | Ferry et al. | 379/413 X |
| 4,571,460 | 2/1986 | Rosenbaum et al. | 379/412 X |
| 4,581,487 | 4/1986 | Cochran | 379/413 X |

Primary Examiner—Eugene R. LaRoche
Assistant Examiner—Benny Lee
Attorney, Agent, or Firm—J. E. Moorhouse

[57] ABSTRACT

A line interface circuit supplies energizing current for operation of a two wire communication line and couples a.c. signals between the communication line and a telephone facility. Tip and ring rails are resistively connected to the communication line by matched feed resistors in a resistance network also including tip and ring taps. Active impedance circuits in an a.c. signal coupling circuit terminate the tip and ring rails with a predetermined impedance, via the feed resistors, in response to voltages at the tip and ring taps. Active resistance valving circuits in a direct current feed circuit supply the communication line with energizing direct current via the tip and ring rails and feed resistors. The valving circuits may be controlled to limit current for shorter lines and the functions of the a.c. signals coupling circuit may be optimally altered in response thereto. In one example, operating band width is extended into ISDN frequencies by providing a secondary resistance network with secondary feed resistors coupling secondary tip and ring rails to the tip and ring rails. In this structure, the a.c. signal coupling circuit is responsive to a.c. signals at secondary tip and ring taps for terminating the secondary rails and a supervisory circuit is responsive to the voltages at the tip and ring taps for generating supervisory signals for the telephone facility.

43 Claims, 8 Drawing Sheets

LINE INTERFACE CIRCUIT

The invention is in the field of telephony communication line interface circuits and more particularly concerns a line circuit wherein alternating current signal components and direct current components are interfaced via respective active impedance and active resistance circuits.

BACKGROUND OF THE INVENTION

In recent years, various line interface circuits have been developed wherein the tip and ring leads of a subscriber's loop are terminated directly or indirectly at tip and ring active feed means, as exemplified in each of the following listed U.S. Pat. Nos.:
4,321,430—Ferrieu (Mar. 23, 1982)
4,387,273—Chea, Jr. (June 7, 1983)
4,484,032—Rosenbaum (Nov. 20, 1984)
4,514,595—Rosenbaum et al (Apr. 30, 1985)
4,539,438—Rosenbaum et al (Sept. 3, 1985)
4,571,460—Rosenbaum et al (Feb. 18, 1986)

In the later four listed patents, examples of line circuits described therein usually include a.c. and d.c. feedback networks or the like which serve to determine the effective operating output impedances of the active feed means.

It is an object of the invention to provide a line interface circuit wherein a.c. line impedance termination and d.c. line feed resistance termination are segregated and independent one from the other.

In each of the four examples, a non-linear element may be combined with the d.c. feedback network whereby line feed current is limited to a predetermined value by increasing the resistances of the active feed means. This feature is useful for conservation of current supply on short subscriber loops, however it may be deleterious to voice quality as it effectively inhibits the equalization characteristics of a typical telephone set remotely connected to the short communication line. In the designs of typical telephone sets, response characteristics of both the transmitting and receiving apparatus therein have been taylored to compensate for the lesser signal loss on short loops. The transmitting and receiving apparatus are arranged to be progressively less sensitive in the presence of line current in excess of about 40 milliamps. Therefore, in short loops a function of line current limiting increases a.c. signal levels, received from the typical telephone, to beyond that normally expected in the telephone system.

Another problem in termination of telephone lines is that the typical line interface circuit is adaptable to one of only two specified standard impedances. One being specified for the majority of telephone lines and the other being specified for extremely long telephone lines which are inductively loaded to enhance analog voice band transmission. In actual practice however, not all telephone lines are of one or the other standard impedance, and hence in full duplex operation the hybrid circuit function is less than optimal and may permit oscillation sometimes referred to as singing because of insufficient return loss. Operating telephone companies usually avoid this problem by a simple expedient of having about eight decibels of loss in each line interface circuit. Hence in a typical telephone conversation between telephone subscribers, about sixteen decibels of loss is inserted between the transmitter of one subscriber and the receiver of another subscriber. Recently, some telephony networking features of private branch exchanges in combination with one or more operating companies involve four or more two-wire communication lines and line interface circuits in a tandem connection. In such an arrangement, typically more than forty decibels of loss is inserted, making conversation difficult in all but the quietest of environments.

It is an object of the invention to obtain an effective measure of the communication line from a current limiting action in the d.c. line feed resistance termination, and to use this measure to vary the a.c. line impedance termination accordingly whereby attenuation and return loss values, in a group of typical telephone lines, are more consistently optimized.

One structural characteristic common to many of the examples in the previously mentioned patents is that of a resistance network which includes tip and ring feed resistors arranged in series between tip and ring leads of the communication line and tip and ring active impedance feed means. The resistance network also includes tip and ring voltages dividers including tip and ring taps from whence d.c. voltages are utilized for detection of supervisory states and a.c. voltages are utilized to receive voice band information and to dynamically control the tip and ring active impedance feed means. As a practical matter, it is preferred that the resistance network be provided on a supporting substrate and that individual resistive elements be trimable to achieve close ohmic matches between various of the resistors. If the line interface circuit is to be adapted for higher than voice band frequency signals, as for example may be the case of terminating a "U" interface in an integrated subscriber digital network (ISDN), parasitic capacitances associated with the physical resistance elements must also be closely matched. Any reactive mismatch, for example a picofarad or so, is amplified by following amplifier elements, such as to render the line circuit virtually useless at ISDN operating frequencies. Unfortunately, precision matching of the parasitic capacitance to the degree required is at least for the present impractical.

It is therefore an object of the invention to provide a line interface circuit having a practical operating band width of about 200 khz, which includes the audio spectrum and the ISDN 2B+D basic rate service U interface band width requirements.

SUMMARY OF THE INVENTION

A line interface circuit, in accordance with the invention, comprises a direct current feed termination for providing energizing current for operation of a two wire communication line, and an a.c. signal feed termination for coupling a.c. signals between the communication line and a telecommunications facility. The feed terminations are connected in parallel to tip and ring feed resistors for connection to tip and ring leads of the communication line. The tip and ring feed resistors are part of a resistance network which includes tip and ring voltage taps in tip and ring voltage dividers, the tip and ring voltage taps being connected to a differential input of the a.c. signal feed termination.

A method for interfacing a two wire communication line and a telecommunication facility, in accordance with the invention, comprises providing a resistance network including tip and ring feed resistors and tip and ring taps in tip and ring voltage dividers. Energizing direct current is valved through the communications line via the tip and ring feed resistors. Signal representation of signals appearing at the tip and ring taps are coupled to the telecommunications facility. In response to differential a.c. signals appearing at the tip and ring taps and a.c. signals from the telecommunications facility, alternating current is fed, differentially in antiphase with respect to the a.c. signals at the tip and ring taps, to the communication line. Thereby, the communication line is terminated with an a.c. impedance being substantially independent of a resistance associated with the valving of the energizing direct current.

In one example, a line interface circuit includes tip and ring terminals for connection to a communication line and ground and battery terminals for connection to a source of energizing direct current. A resistance network includes tip and ring feed resistors which are connected between the tip and ring terminals and tip and ring rails respectively. The resistance network also includes tip and ring voltage dividers having respective tip and ring taps. An alternating current coupling means includes tip and ring active impedance feed means being connected to the tip and ring rails respectively, and a differential amplifier circuit with inputs connected to the tip and ring taps. The active impedance feed means are responsive to a.c. signals from the output of the differential amplifier circuit for terminating the communication line with a predetermined a.c. impedance such that the a.c. coupling means is operative for coupling a.c. signals between the communication line and a telephone facility. The line interface circuit also includes a direct current feed means including tip and ring active resistance valving means for conducting energizing direct currents between the ground and power terminals and the tip and ring rails. One of the valving means is operative to conduct at a predetermined resistance and the other of the valving means is operative to conduct at a resistance which maintains a voltage difference across the other valving means which is similar to a voltage difference across the one valving means.

In another example, the line interface circuit includes a transformer with tip and ring primary windings, each being connected in series between the tip and ring rails and the respective tip and ring active impedance feed means, and a coupling network. The coupling network is operative for coupling a.c. signals and an inversion of same to inputs of the respective tip and ring active impedance feed means. The coupling network also includes a reactive network for defining nominal effective operating feed impedances of the feed means. The line circuit may also include an equalization circuit being responsive to a current limiting occurrence in one of the feed means for modifying a function of the coupling network to improve a return loss operating characteristic of a hybrid circuit associated with the communication line.

Yet another example of a line interface circuit, in accordance with the invention, includes tip and ring terminals for connection to a communication line and ground and battery terminals for connection to a source of power. A primary resistance network includes primary tip and ring feed resistors being connected between the tip and ring terminals and primary tip and ring rails respectively, and primary tip and ring taps within primary tip and ring voltage dividers. A primary differential amplifier circuit includes inputs connected to the primary tip and ring taps and is responsive to voltages at these taps for generating supervisory signals for use in a telephone facility. A direct current feed circuit includes tip and ring active resistance valving means for conducting energizing direct currents between the ground and power terminals and the primary tip and ring rails. A secondary resistance network includes secondary tip and ring feed resistors being connected between the primary tip and ring rails and secondary tip and ring rails respectively, and secondary tip and ring taps within secondary tip and ring voltage dividers. An alternating current coupling means includes tip and ring active impedance feed means being connected to the secondary tip and ring rails respectively, and a differential amplifier circuit with inputs connected to the secondary tip and ring taps. The active impedance feed means is responsive to a.c. signals from the output of the differential amplifier circuit for terminating the communication line with a predetermined impedance such that the a.c. coupling means is operable for coupling a.c. signals between the communication line and the telephone facility.

BRIEF DESCRIPTION OF THE DRAWINGS

Example embodiments are discussed with reference to the accompanying drawings in which.

DESCRIPTION OF THE EXAMPLE EMBODIMENTS

Figure 1:
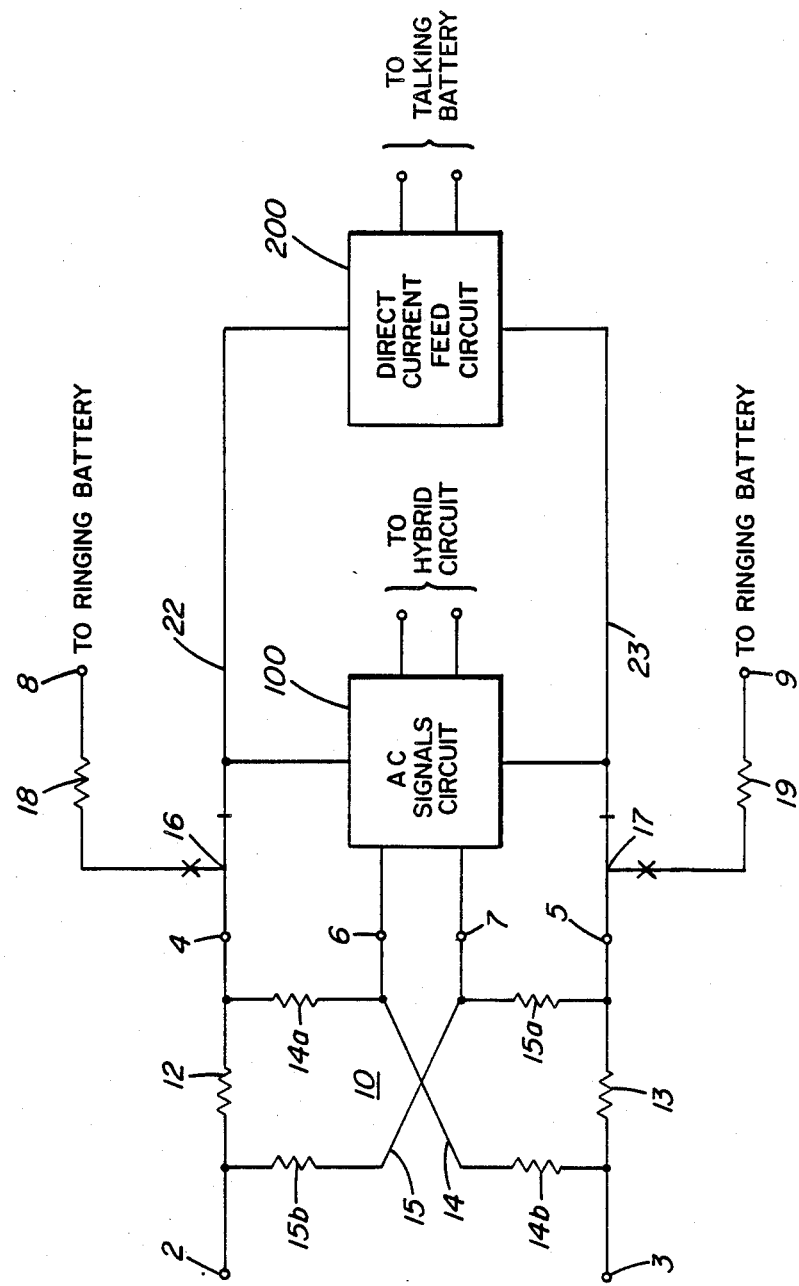
FIG. 1 is a block schematic diagram of a line interface circuit in accordance with the invention.

The line circuit illustrated in FIG. 1 includes a resistance network 10 which is connected between tip and ring terminals 2 and 3 and tip and ring rails 22 and 23 via tip and ring rail terminals 4 and 5. An a.c. signal circuit 100 and a direct current feed circuit 200 are each connected in parallel one with the other to the tip and ring rail terminals 4 and 5 via the tip and ring rails 22 and 23. Alternately, relay transfer contacts 16 and 17 may be operated to connect ringing battery (not shown) by way of ringing battery terminals 8 and 9 and ringing battery feed resistors 18 and 19 to the tip and ring rail terminals 4 and 5, to the exclusion of the tip and ring rails 22 and 23.

Furthermore, protection devices or networks, not shown, are typically connected to the tip and ring rail terminals 4 and 5 and/or rails 22 and 23 and sometimes in association with the tip and ring terminals 2 and 3. Such devices are intended to divert itinerant current spikes and/or surges away from the circuits 100 and 200, and so preserve the operational integrity of these circuits. However, as this function and the function of the ringing current feed via the resistors 18 and 19 are not of direct interest regarding the invention, these elements of a typical telephone line interface circuit are not further discussed.

The direct current feed circuit 200 is connected to a source of power, usually a +50 volt battery or the like, in an associated telephone facility, not shown. The source of power is typically referred to as a talking battery. The direct current feed circuit 200 functions by providing a resistively regulated active feed path between the talking battery and tip and ring feed resistors 12 and 13 in the resistance network 10, and thence to an OFF HOOK subscriber telephone line. The feed circuit 200 at the same time operates with an impedance sufficient to block differential alternating currents. The telephone line is not shown but is normally connected to the tip and ring terminals 2 and 3. Of course, the subscriber line is in an ON HOOK condition, when the line is open and hence substantially no current should be drawn from the talking battery.

The resistance network 10 includes tip and ring voltage dividers 14 and 15 which are provided by resistors 14a and 14b and 15a and 15b connected as shown to provide tip and ring taps 6 and 7. In normal operation, the a.c. signals circuit 100 is responsive to differential signals at the tip and ring taps 6 and 7 to drive the tip and ring rails 22 and 23 in antiphase thereto, to reduce these voltages at the terminals 2 and 3 as if the telephone line were terminated at some impedance. The amount of the impedance is determined by an internal impedance network, the actual impedance of which is determined in accordance with the desired terminating impedance for the telephone line and by the response characteristics of circuits within the a.c. signal circuit 100. The circuit 100 also receives a.c. signals from a hybrid circuit, not shown, in the associated telephone facility and transmits these via the tip and ring rails, and in addition, provides the hybrid circuit within signals preferably to the exclusion of longitudinal signals as these signals appear at the tip and ring taps 6 and 7. These functions of direct current feed and impedance termination are advantageously provided by the separate circuits 100 and 200 in that variations or adjustments may be affected with respect to one of these functions with little or no consequence to the other of these functions.

Figure 2:
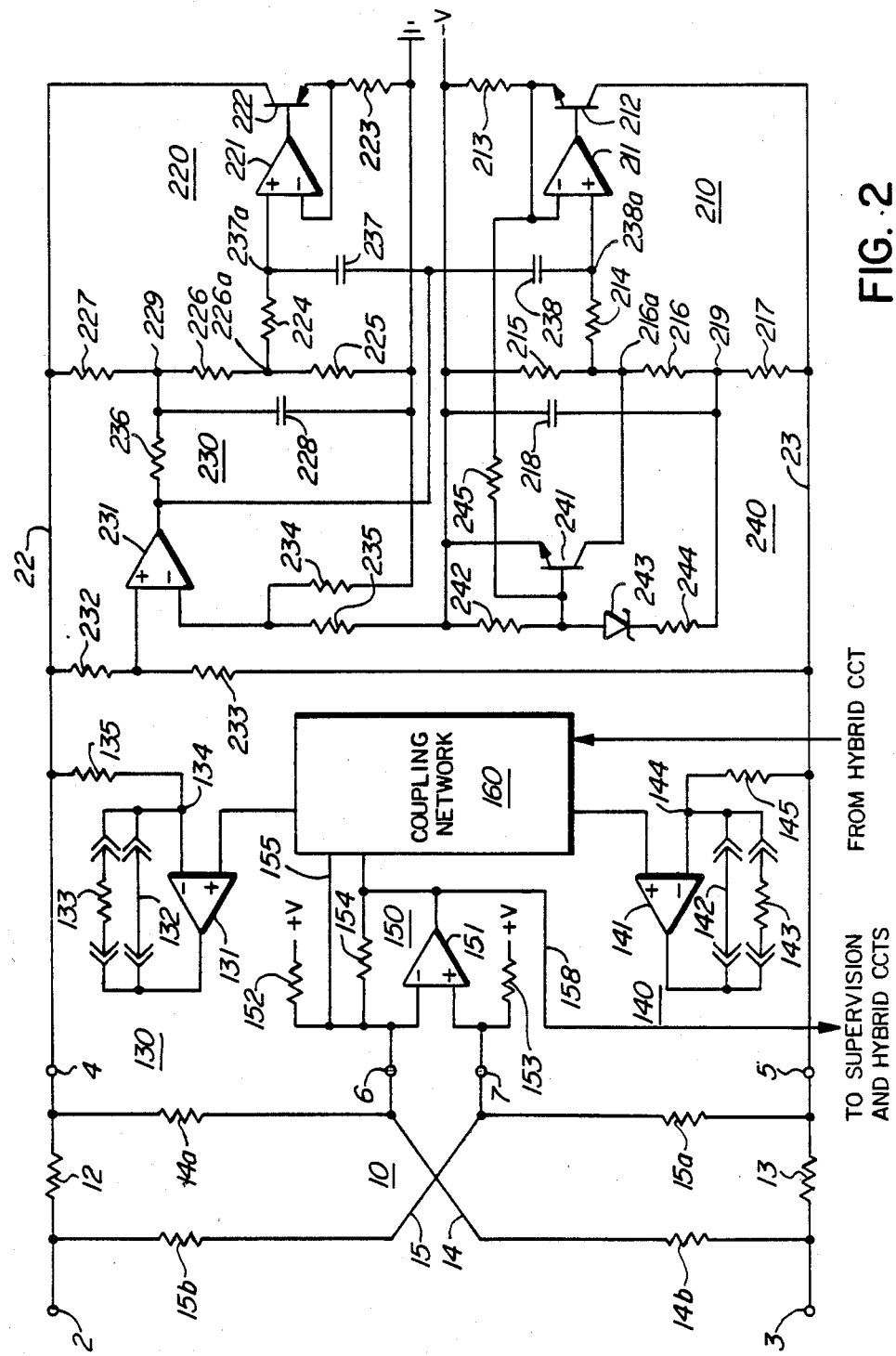
FIG. 2 is a schematic diagram illustrating one detailed example of the line interface circuit in FIG. 1.

One detailed example of circuitry suitable for providing the line interface circuit of FIG. 1 is illustrated in FIG. 2. In FIG. 2 and in the subsequent figures, elements which are the same are identified by the same labels. In the case of circuit blocks having a label including a units digit 0, there may be some minor variations between one figure and another. Where such circuit blocks are discussed, such variations are likewise discussed. Only those power and ground paths as may be helpful in the understanding of the structure and function of the illustrated example are shown, in the interests of brevity and simplicity of description.

Referring specifically to FIG. 2, the resistance network 10 is connected to a detector circuit 150 which is provided by a differential amplifier 151 and associated resistor elements 152 to 154 connected as shown. In operation, the output 158 of the differential amplifier 151 provides ON HOOK and OFF HOOK indications and a.c. signals corresponding to differential a.c. signals appearing at the tip and ring taps 6 and 7. Immunity to longitudinal signals as may be introduced along the communication line is dependent not only upon the common mode rejection characteristics of the differential amplifier 151 but also on the precision matching of ohmic values of the tip and ring feed resistors 12 and 13 and also upon the precision matching of ohmic values of the tip and ring voltage divider resistors 14a and 14b and 15a and 15b.

An a.c. signals coupling network 160 is connected between the output 158 and tip and ring active impedance feed circuits 130 and 140. The function of the network 160 is to couple a.c. driving signals of one phase to the tip circuit 130 and of an opposite phase to the ring circuit 140. The network 160 also includes an impedance network placed between the output 158 and a lead 155 for defining the response of the differential amplifier 151 to a.c. signals, thereby defining the effective terminating impedance of the tip and ring circuits 130 and 140.

Each of the tip and ring active impedance feed circuits 130 and 140 is provided by a differential amplifier 131 and 141 arranged in one of two optionally configured voltage follower configurations. For example, the output of the amplifier 131 is either connected directly via a path 132 to a junction 134 of its inverting input and tip rail 22, or connected indirectly via a resistor 133 to a junction 134. Likewise a corresponding arrangement prevails in the ring active impedance feed circuit 140. When the resistance option is used, 100 Ohm resistors 133 and 143, for example, permit test observations of amplifier functions without consequence to the function of the operating line circuit.

The direct current feed circuit 200 as used in any of the figures is illustrated in detail in FIG. 2 and includes ring and tip active resistance valving circuits 210 and 220, and a follower control circuit 230. The direct current feed circuit 200 also includes a direct coupled control means 240, which functions to provide a feed current limit control and overvoltage protection.

The ring active resistance valving circuit 210 includes an amplifier 211 connected in a voltage follower configuration with an NPN transistor 212 being connected in series with a resistor 213 between a negative potential −V terminal of the talking battery and the ring rail 23. A voltage divider includes resistors 215, 216 and 217 connected between the −V terminal and the ring rail 23 and provides voltage taps 216a and 219, as shown. A capacitor 218 is connected between −V terminal and the voltage tap 219 to provide an a.c. ground at the voltage tap 219. A resistor 214 is connected between the voltage tap 216a and a non-inverting input of the amplifier 211. The tip active resistance valving circuit 220 includes similar circuit elements connected in a similar configuration between the ground terminal of the talking battery and the tip rail 22, however in this case, the transistor 222 is a PNP device. The following control circuit 230 includes a differential amplifier 231 having a non-inverting input connected to a rail tap at a junction of resistors 232 and 233 which are connected in series between the tip and ring rails 22 and 23. The inverting input of the differential amplifier 231 is connected to a power tap at a junction of resistors 234 and 235 which are connected in series between the ground and the −V terminal. An output of the differential amplifier 231 is resistively coupled to the voltage tap 229 by a resistor 236.

In normal function as thus far introduced, the tip and ring active resistance valving circuits 220 and 210 operate under the control of the respective voltage dividers such that when the subscriber line is in the OFF HOOK condition, part of the resistance to direct current flow is provided by the transistors 212 and 222, with most of the remainder of the resistance being provided by the tip and ring feed resistors 12 and 13. For example, in an arrangement requiring a 400 Ohm feed resistance, the tip and ring feed resistors would each be 100 Ohms, the resistor 213 and 223 would each be about 20 Ohms and an active resistance of about 80 Ohms would be imparted by the valving action of each of the transistors 212 and 222. Under these conditions, the amount of direct energizing current flow is substantially determined by the length of the subscriber line. The presence of the follower control circuit 230 is not normally of any consequence under these conditions. In this example however, the follower control circuit also includes a capacitive coupling via capacitors 237 and 238 and junctions 237a and 238a, to the non-inverting inputs of the amplifiers 221 and 211. By this arrangement, the tip and ring active resistance valving circuits present virtually no active resistance, only passive resistance to longitudinal currents as may be induced on the subscriber line to which the line interface circuit is connected. By means of negative feedback, this circuit implements in fact two common mode virtual grounds for longitudinal a.c. currents, over the tip and ring rails 22 and 23 and therefore two low impedance paths for longitudinal a.c. currents.

By deleting capacitors 237 and 238, alternative low impedance paths are achieved for longitudinal currents via resistors 135 and 145 to the junctions 134 and 144 which are two common mode virtual grounds. Matching requirements apply for the resistors 135 and 145 in this case, in order to meet the longitudinal balance required performance. This is an optional arrangement which is particularly advantageous in the example line interface circuit illustrated in FIGS. 4 to 7. However this description is introduced in FIG. 2 as a matter of illustrative convenience.

The feed current limit control circuit 240 includes an NPN transistor 241 having an emitter electrode connected to the −V terminal and a collector electrode connected to the tap 216a of the voltage divider 215 to 217 such that any significant potential at a base electrode of the transistor 241 causes a potential at the tap 216a to be drawn toward the −V terminal potential. By selection of appropriate resistance values for resistors 245 and 242 it is arranged that at about 40 milliamperes of current flow in the resistor 213, about half a volt or so lesser negative voltage than the potential of the −V terminal appears at the junction of these resistors. This causes the transistor 241 to conduct a little which increases the negative voltage at the junction 216a. Consequently, the current flow via the transistor 212 is restricted, causing the voltage on the ring rail 23 to be reduced toward ground. Sufficient voltage reduction on the ring rail 23 as might be caused by a ground fault somewhere along the ring side of the subscriber loop, will cause a 24 volt Zener diode 243 of conduct via a resistor 244. This has an effect of turning on the transistor 241 and valving the transistor 212 to be almost off. Normally, the feed current limit control circuit only operates with any effect when a short and hence low resistance loop is connected across the tip and ring terminals 2 and 3. In this event as before mentioned, current is partially restricted or valved at the transistor 212. A resulting voltage shift at the ring rail 23 is sensed by the following control circuit 230, which in turn causes a complementary valving action in the transistor 222 and a complementary shift of voltage at the tip rail 22.

This use of current limiting introduces an a.c. terminating problem. In any population of subscriber loops, the majority of the loops are of moderate to long length and thus each exhibits a characteristic impedance very close to that preferred and specified, for example in Local Area Telecommunications Authority Switching System General Requirements L.S.S.G.R published by Bellcore. Such loops do not activate the current limiting function. However in actual practice the shorter loops, are normally concentrated in heavily populated urban centres and normally draw more than 40 milliamps of current. Such loops are each in actual fact of a lower than specified characteristic impedance. Over the years, this problem has been partially compensated by operating characteristics of many telephone station sets wherein thermistors are used to attenuate received signals and a carbon microphone of lesser efficiency at high energizing currents is also used. At the line interface circuit, trans-hybrid loss in any two-wire four-wire conversion function is reduced by mismatch. That is to say that the side tone becomes greater than that attained with the proper impedance match. In order to prevent oscillations, sometimes referred to as singing, which may occur under some operating conditions, it is a typical practice of an operating telephone company to use a hybrid circuit, usually of the electronic type, which introduces about eight to ten decibels of bidirectional attenuation in addition to the typical hybrid function. This has proven to be quite acceptable for typical telephone usage. However, in a telephone call invoking special PBX features, which may require a conversation to traverse at least four line interface circuits, accumulated loss can become intolerable. It is an object of the invention to provide an equalizing function within the line interface circuit whereby signal levels are reduced only on shorter loops, independently of a hybrid circuit, and in accordance with a feed current limiting function in the line interface circuit.

Figure 3:
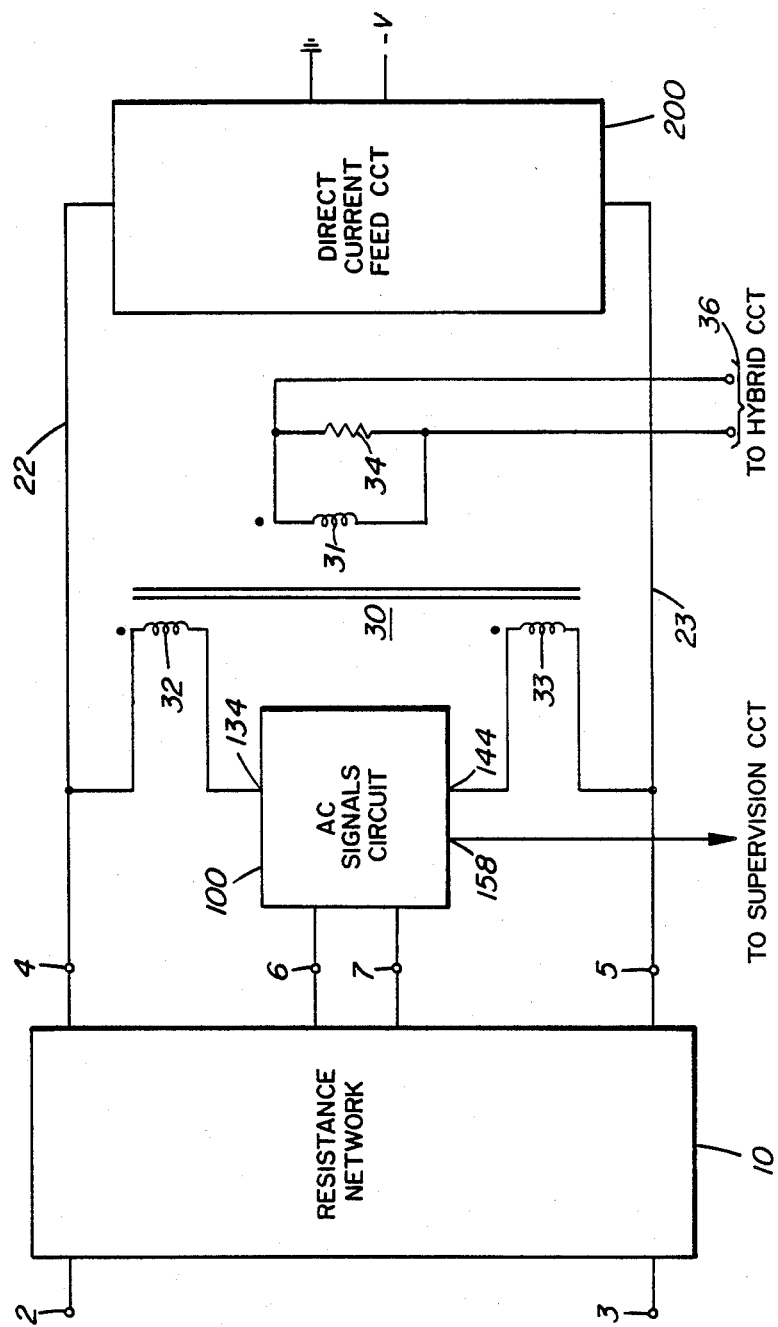
FIG. 3 is a block schematic diagram illustrating a line interface circuit as in FIGS. 1 or 2 with the addition of a line transformer.

In FIG. 2, the functions of differential signal response and common mode rejection are very dependent on a very high standard of operation of the differential amplifier 151. These functions are optimized by obtaining the closest possible match of the tip and ring feed resistors 12 and 13 and similar tolerance of match between the resistors 14a and 14b and 15a and 15b. However, because the direct current feed function is separate from the a.c. signal termination function as shown in FIGS. 1 and 2, voice band a.c. signal termination and feed functions are enhanced, without requiring any impractical matching of resistance values in the network 10, by utilization of a line circuit transformer as is exemplified in FIG. 3. The line interface circuit in FIG. 3 is substantially the same as that illustrated in FIG. 2, except that a very small line circuit transformer 30 is introduced. Being very small, such transformers are cheap to manufacture or purchase and are easily mounted on a printed circuit board. In this case, the transformer may be very small as it is completely isolated from any direct current. As shown, the transformer includes tip and ring primary windings 32 and 33 connected between the junction 134 and the tip rail 22 and the junction 144 and the ring rail 23 respectively. A secondary winding 31 is shunted by a resistor 34 which modifies the apparent low frequency characteristics of the transformer 30. The secondary winding is connectable to a hybrid circuit in the associated telephone facility via terminals 36 in this case, since the primary windings 32 and 33 are very well matched by construction and since the d.c. resistance of the primary windings 32 and 33 is very low, it is preferable to delete capacitors 237 and 238 from the circuit 200 and thus to implement the longitudinal current paths via the primary windings 32 and 33 to the common mode virtual grounds at the junctions 134 and 144.

Another recent problem realized in the technology of line interface circuits is that of extending the operating frequency of such circuits through the ISDN basic rate frequency band, that is to at least 200 kilohertz. It has been found that in circuits which rely upon tip and ring taps for sensing line signals that even very close matching of resistances in the resistance network 10 is insufficient to extend the desired operating bandwidth to more than about twice the typical telephone voice band. The apparent reason for this problem is that of parasitic capacitance mismatch among the resistance elements in the network 10. One solution to this problem is to both reduce and match the parasitic capacitance however, at this time this solution appears to be virtually impossible to practice. Another solution which tolerates parasitic capacitance is that of a line interface circuit design as exemplified in FIG. 4.

Figure 4:
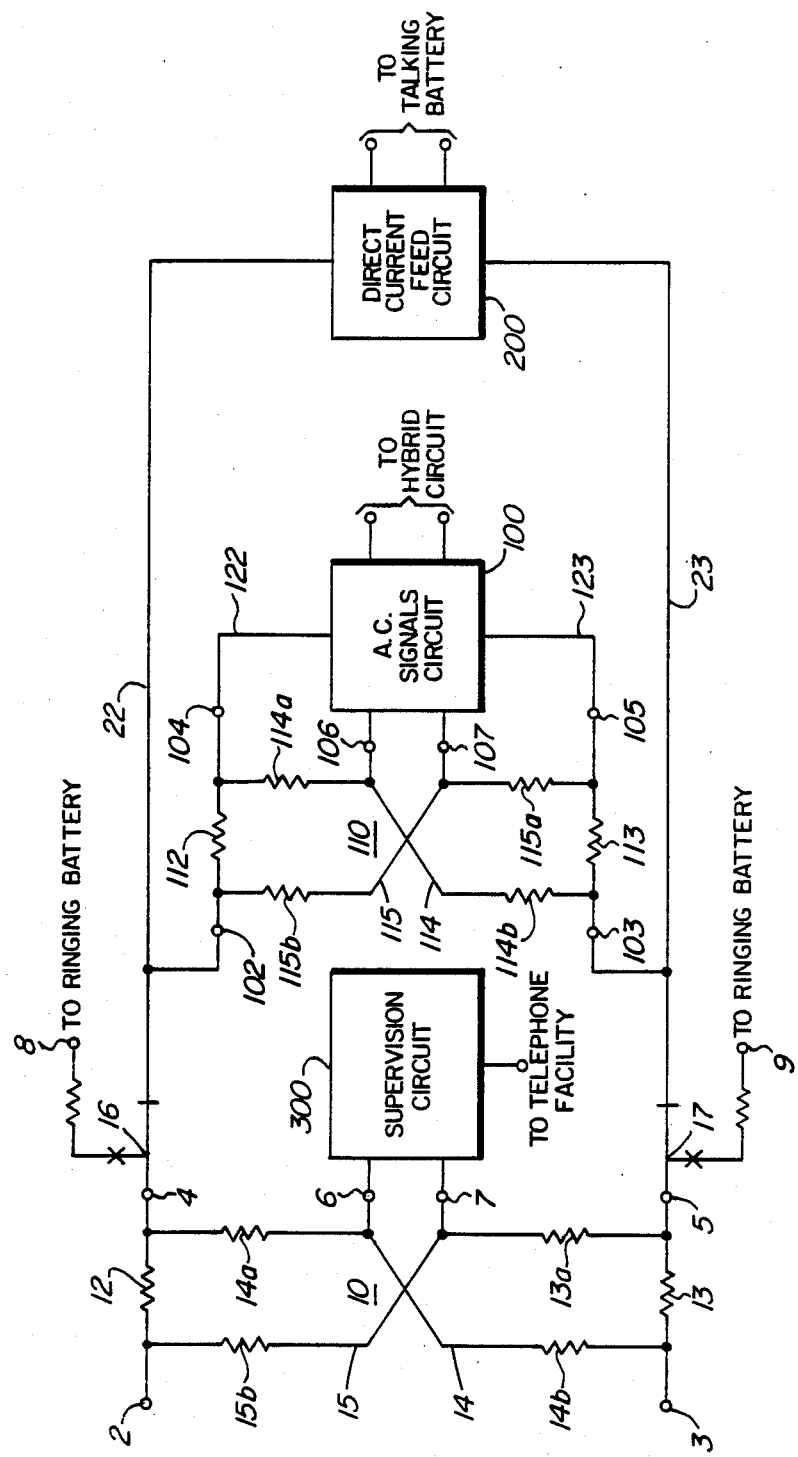
FIG. 4 is a block schematic diagram of another line interface circuit, in accordance with the invention.

FIG. 4 is similar to the preceding figures in that it includes the a.c. signal circuit 100, the direct current feed circuit 200 and the network 10, however in this case the network 10 is now referred to as a primary resistance network 10 as there is also introduced a secondary resistance network 110. The networks are connected as shown with a supervision circuit 300 and the a.c. signal circuit 100 respectively.

In operation, the supervision circuit 300 detects ON HOOK and OFF HOOK states by sensing voltages developed by current flows in the primary tip and ring feed resistors 12 and 13. The direct current feed circuit 200 operates similarly as discussed in relation to the preceding figures to feed energizing current via the tip and ring rails 22 and 23, the transfer contacts 16 and 17, the tip and ring rail terminals 4 and 5, the tip and ring primary feed resistors 12 and 13, and the tip and ring terminals 2 and 3, to a communication line (not shown) connected thereto. The a.c. signal circuit 100 operates similarly as discussed in relation to the preceding figures to provide a predetermined impedance termination for coupling a.c. signals between the communication line and a hybrid circuit in an associated telephone facility (not shown). The secondary resistance network 110 is similar to the primary resistance network 10 and has similar elements labeled similarly with a distinction being that of a hundreds digit. Secondary tip and ring feed resistors 112 and 113 are connected as shown between the primary tip and ring rails 22 and 23 and secondary tip and ring rails 122 and 123 respectively, via terminals 102 to 105. Secondary tip and ring taps 106 and 107 are connected to the a.c. signal circuit 100. In operation, voltages at the secondary tip and ring taps 106 and 107 are developed in response to a.c. currents in the secondary tip and ring feed resistors. By means of the primary and secondary networks and the associated circuitry, the operating frequency range is significantly extended far beyond the analog voice band. This is achieved because of the particular architecture of the circuit. Since the circuit 200 implements two common mode virtual grounds for longitudinal currents over the tip and ring rails 22 and 23 as previously discussed, there are not longitudinal currents flowing through resistors 112 and 113. Hence, the parasitic capacitances over either the primary or secondary resistor networks 10 and 110 do not have any negative impact on the longitudinal balance performance of the circuit. Therefore capacitance matching is not a critical requirement for operation at the higher frequencies.

Figure 5:
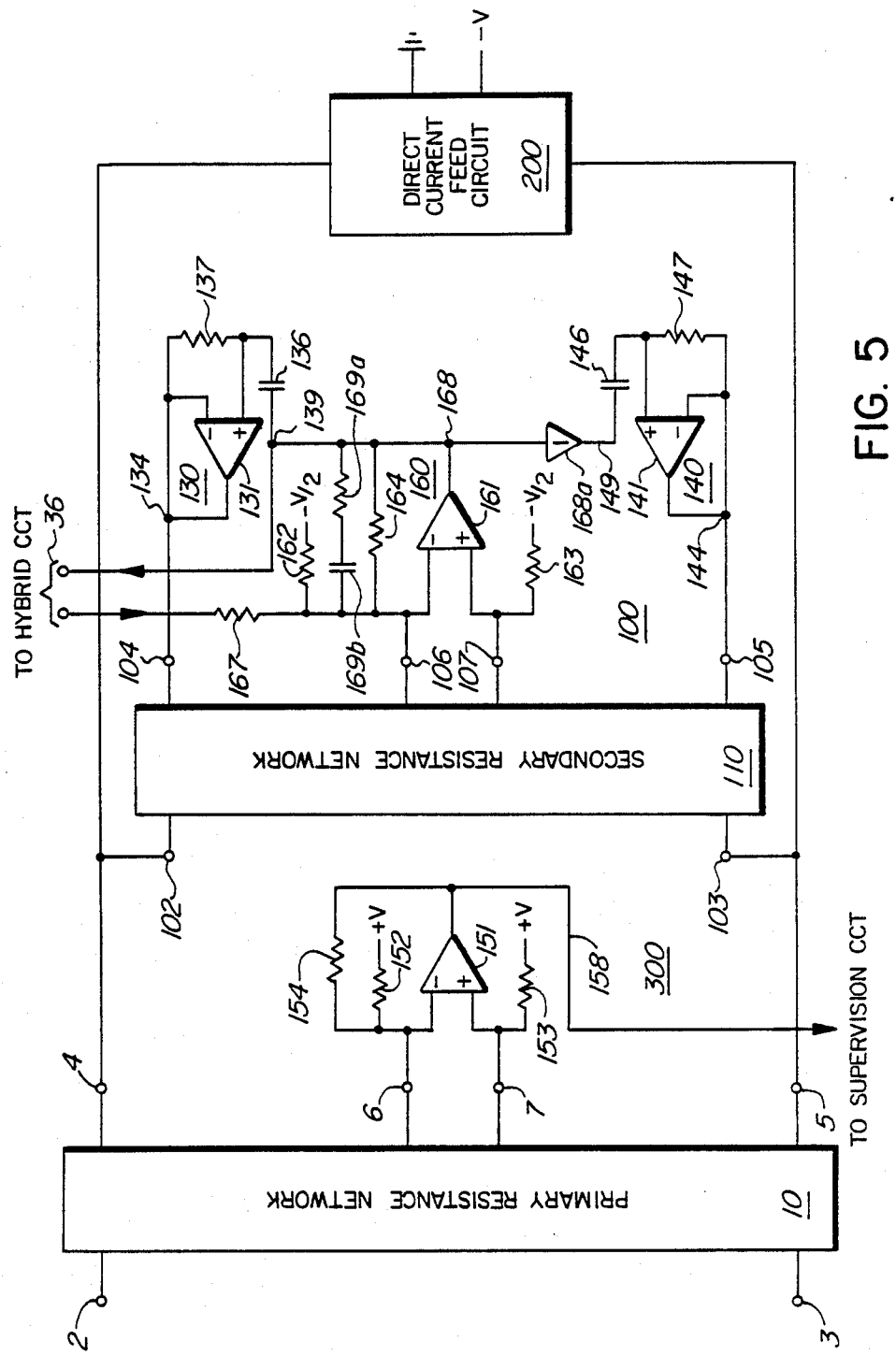
FIG. 5 is a block schematic diagram showing some exemplary details of the line interface circuit illustrated in FIG. 4.

One implementation of the line interface circuit in FIG. 4 is shown more detail in FIG. 5. The structure and operation of FIG. 5 is generally self-evident in view of the previous discussions. However, a few areas of the figures are here discussed for clarity. The supervision circuit 300, primarily consists of the detector circuit 150, discussed in relation to FIG. 2, with the exception that the output 158 is for connection solely to a supervision circuit in an associated telephone facility. The a.c. signals circuit 100 is provided by a differential amplifier circuit at 160 which includes an amplifier 161 with an output 168 and a d.c. a feedback path including a resistor 164 and an a.c. feedback path including a capacitor 169b and a resistor 169a connected as shown. A resistor 167 is connected between one of the terminals 36 and an inverting input of the amplifier 161 for receiving signals from the hybrid circuit. The output 168 is for direct coupling to a hybrid circuit via another of the terminals 36, and is also connected to drive the tip active impedance feed circuit 130 via a junction 139 and a capacitor 136. The ring active impedance feed circuit 140 is driven at 149 by an inverter 168a and a capacitor 146.

Figure 6:
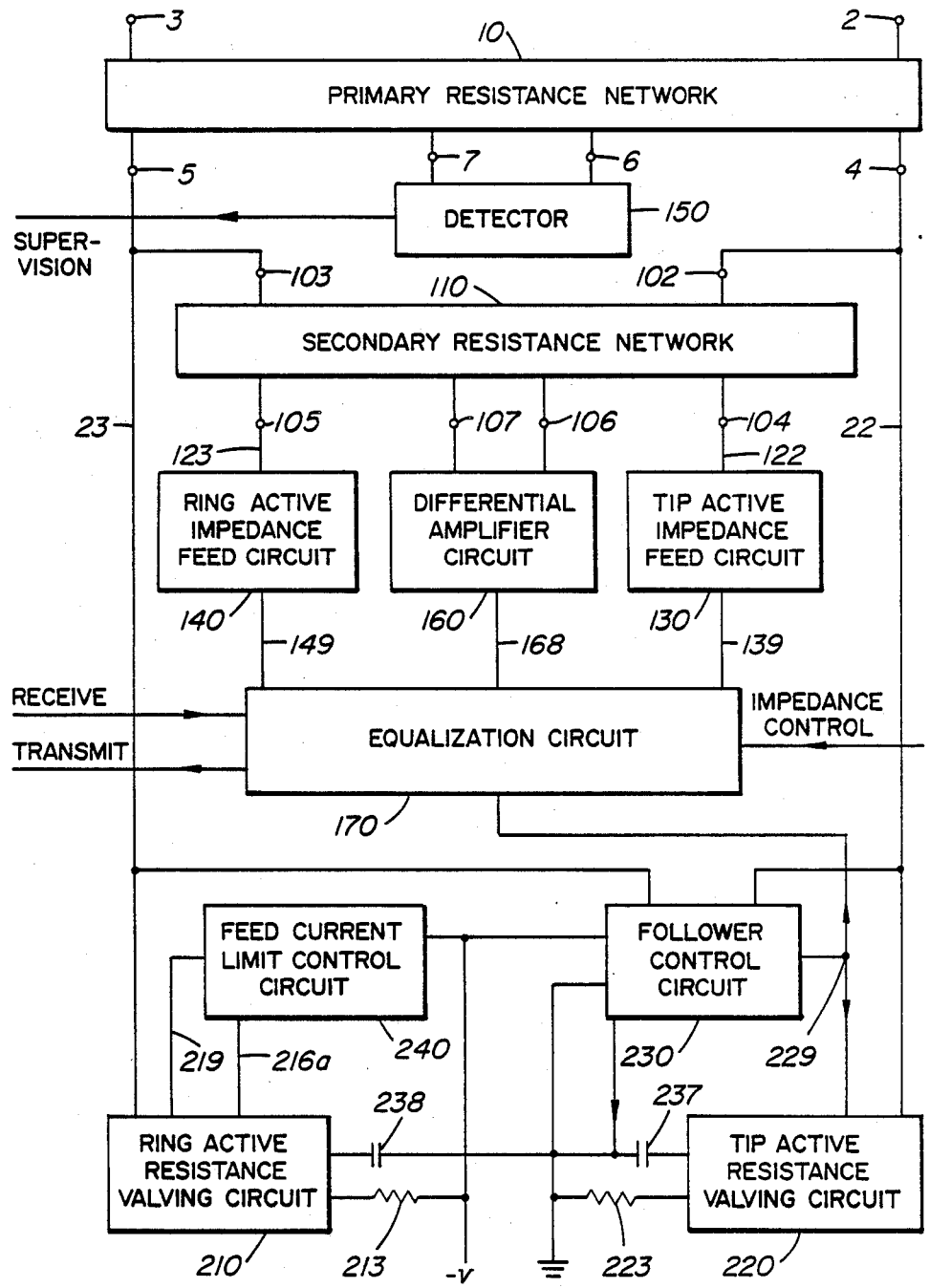
FIG. 6 is a block schematic diagram of another example of the line circuit shown in FIG. 4.

The line interface circuit illustrated in FIG. 6 is similar to that shown in FIG. 5 but for the inclusion of an equalization circuit 170. The equalization circuit 170 includes receive and transmit leads for connection to the hybrid circuit instead of the circuit 160. The output 168 is used by the equalization circuit 170 to generate a transmit output signal with a degree of gain as determined by an impedance control signal which may be manually set, or software generated in the telephone facility. The tip and ring circuits 130 and 140 are driven to greater or lesser extent in anti-phase with the signals at the secondary taps 107 and 106 in accordance with there being one of some or no current limiting function as would be evidenced by a potential at the junction 229. The tip and ring active impedance feed circuits 130 and 140 are also driven via the equalization circuit by signals received from the telephone facility.

Figure 7:
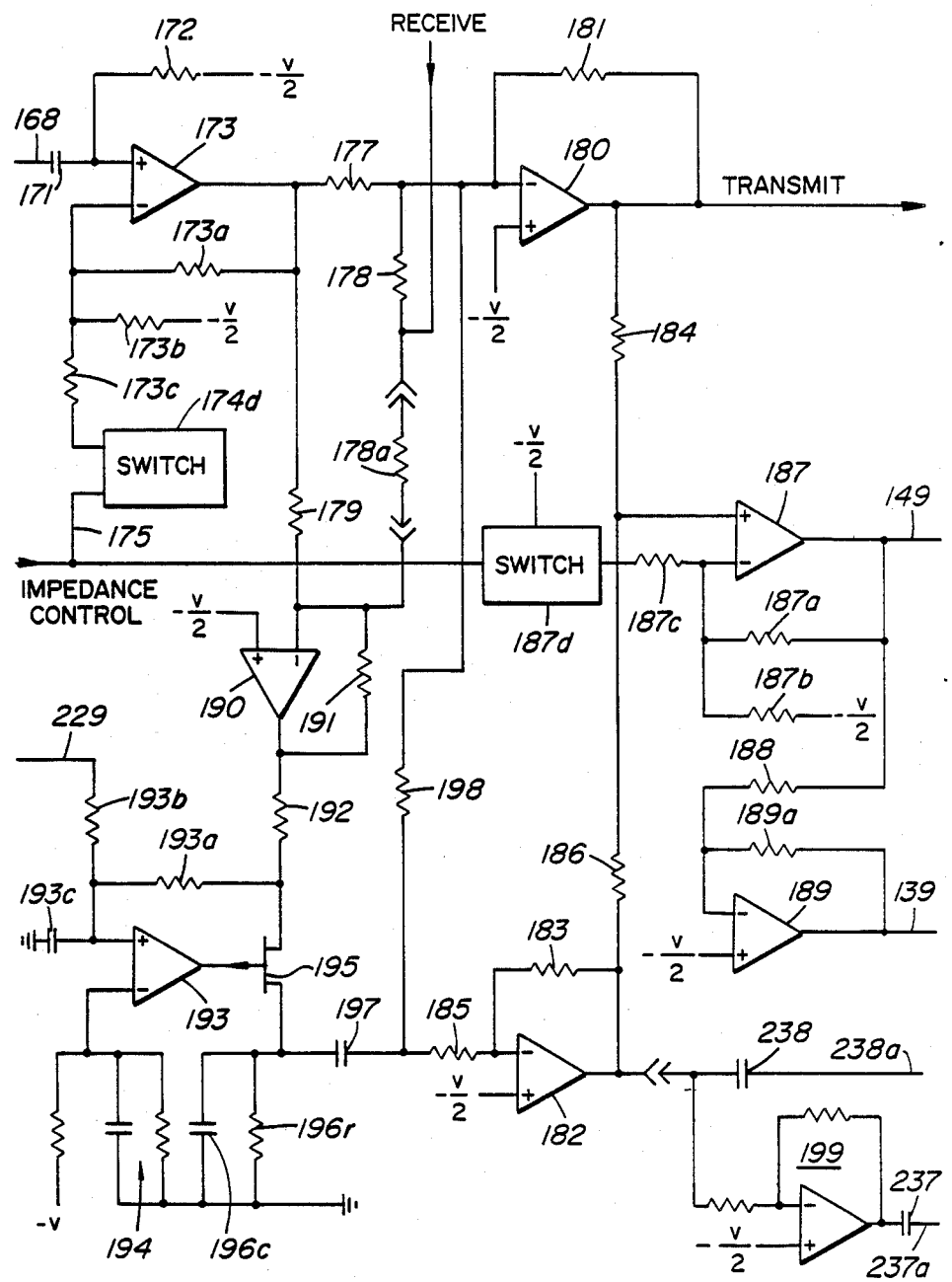
FIG. 7 is a schematic diagram illustrating one example of an equalization circuit used in the line interface circuit in FIG. 6.

The equalization circuit is illustrated with greater detail in FIG. 7. In FIG. 7, those elements with identifying labels 190 to 198 provide for a variable gain function in the equalization circuit. A circuit option shown at 199 is useful to adapt the equalization circuit to the example illustrated in FIG. 8, as will be discussed. This variable gain function is essential to the operation of the equalization circuit. In contrast those elements with identifying labels of 172 to 175 and 187c and 187d provide for a switchable gain function which is merely convenient for adapting a line interface circuit to one of two predetermined or specified communication line characteristic impedances. Hence these elements may be omitted from the equalization circuit. In operation, the equalization circuit receives a.c. signals via a capacitor 171 from the output 168 of the differential amplifier circuit 160 (FIG. 6). Corresponding a.c. signals are applied at a junction of resistors 177 and 178 and are coupled via these resistors to inverting inputs of amplifiers 180 and 190 respectively. Signals on a receive lead from the hybrid circuit in the associated telephone facility, are also coupled to the inverting input of the amplifier 180 via a resistor 178. An output of the amplifier 180 is connected to a transmit lead for supplying signals to the hybrid circuit in the associated telephone facility. This output is also connected to an input of an amplifier 187 via a resistor 184. The amplifier 187 functions as a voltage follower to drive the ring active impedance feed circuit 140 via the lead 149 (FIG. 6), and to drive an inverting amplifier 189 via a resistor 188. An output of the amplifier 189 in turn is connected to drive the tip active impedance feed circuit 130 via the lead 139 (FIG. 6).

Indication of feed current limiting action in the feed current limit control circuit 240 is relayed via the follower control circuit 230, as previously discussed in relation to FIG. 2. This indication is received from the junction 229 and filtered to reduce any a.c. signal components by a resistor 193b and a capacitor 193c. Also a.c. signal components as might otherwise be coupled via a resistor 193a are reduced. A junction of the components 193a, 193b and 193c is connected to an input of an amplifier 193. Circuit components at 194 are arranged to apply a predetermined fraction of the −V terminal potential at an inverting input of the amplifier 193, such that in the event of current limiting the amplifier 193 responds by biasing a FET 195 ON in proportion to a degree of the current limiting. The amplifier 193 drives the d.c. resistance of the FET to such a value to maintain the d.c. voltage at the positive input of the amplifier 193 equal to the constant d.c. voltage at the negative input of the amplifier 193. On the other hand, the value of the FET resistance controls the amount of signal diverted to the amplifiers 180 and 182 via capacitor 197 and resistors 198 and 185, which finally implement the equalization feature.

As a conclusion, the live equalization is a direct, continuous and deterministic function of the loop length. This has an effect of proportionally coupling an inversion of the a.c. signals received by the amplifier 190, via a resistor 192, and the FET 195 to a capacitor 196c and a resistor 196r, connected as shown, and through a coupling capacitor 197. Hence a.c. signals in antiphase are summed via a resistor 198 at the inverting input of the amplifier 180 to effectively attenuate that portion of the transmit signal on the transmit lead which was originally received on the lead 168. This reduction does not have any effect on that portion of the signal on the transmit lead which is coupled via the resistor 178 from the receive lead. These signals coupled via the capacitor 197 are also applied to an input of an inverting amplifier 182 via resistor 185. The output of the amplifier is resistively coupled via resistor 186 to the junction of the resistor 184 and the amplifier 187. Depending upon a ratio of the ohmic values of the resistors 184 and 186, the ultimate effect of a current limiting occurrence is arranged to modify the antiphase a.c. feeding of the communication line by the tip and ring circuits 130 and 140 to a predetermined degree, as is desired.

Switches 174d and 187d are each arranged with associated resistors 173c and 187c to reduce the gains of the respective amplifiers 173 and 187 such that the line interface circuit is controllable via an impedance control lead 175, to provide an optimal termination for a communications line of a lower characteristic impedance. In this example, the component values tabled at the end of the discussion provide for a 900 Ohm impedance while invoking of the impedance option by the lead 175 provides for a 600 Ohm impedance.

Figure 8:
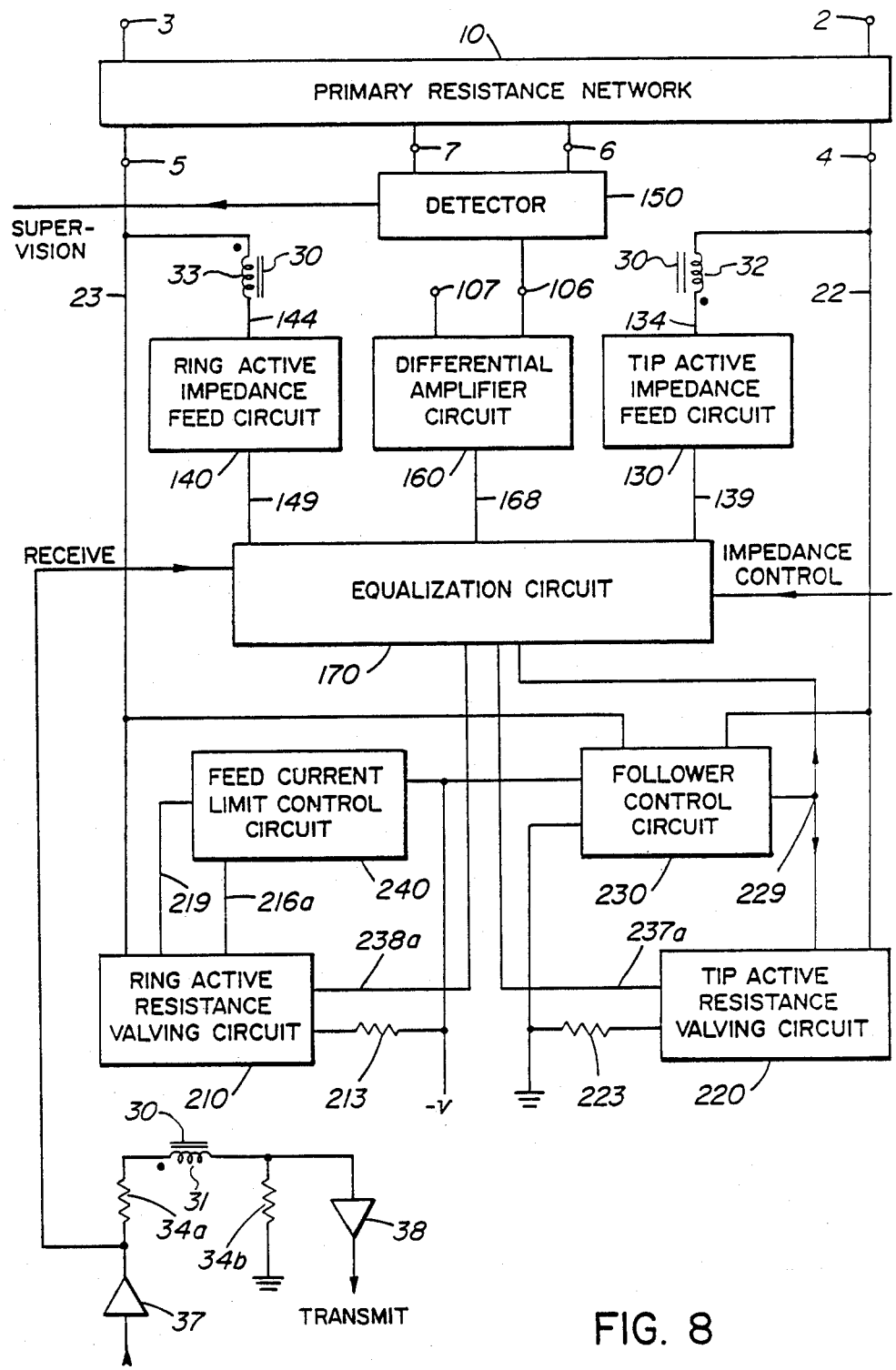
FIG. 8 is a block schematic diagram of another example of a line circuit including a line interface transformer somewhat similar to that shown in FIG. 3, and which includes an equalization circuit as for example is illustrated in FIG. 7.

The line interface circuit illustrated in FIG. 8 is similar to that illustrated in FIG. 6 but for replacement of the secondary resistance network 110 by a line interface transformer for example the transformer 30, previously discussed. Referring to FIGS. 8 and 7 together, the RECEIVE lead in FIG. 7 is driven by signals from a hybrid circuit in the associated telephone facility via an amplifier 37 (FIG. 8) which also drives the primary winding 31 via resistors 34a and 34b. Hence these signals are inductively coupled to the tip and ring rails 22 and 23 via the secondary windings 32 and 33. Signals from the tip and ring rails 22 and 23 are likewise inductively coupled across the transformer 30 and appear as voltage across the resistor 34b along with the signals form the hybrid circuit. These signal voltages across the resistor 34b are coupled to the hybrid circuit via an amplifier 38. Therefore in the equalization circuit in FIG. 7 the TRANSMIT lead is not connected. The circuit at 199 in FIG. 7 is connected to the output of the amplifier 182 such that a.c. signals are supplied to the junctions 237a and 238a in the tip and ring active resistance valving circuits 210 and 220, respectively.

Numerous variations of the example embodiments will become apparent to those of typical skill in the electronic circuit design field with reference to the foregoing discussion and the illustrations. The equalization circuit may be applied to various prior art line interface circuits for example as hereinbefore referred to. Of course, it should be understood that in any configuration, the equalization circuit is in every instance responsive to a current limiting function of the line interface circuit which terminates a shorter communication line such that response to differentially detected a.c. line signals is varied to compensate for telephone station set operation induced by the otherwise desirable current limiting function. Again, one of the benefits derived is that of requiring less attenuation in the service connection of a station set, attenuation which is otherwise required to ensure protection from singing due to less than ideal hybrid circuit performance.

Another advantage is that those subscriber lines provided with a line interface circuit having an equalization circuit will accommodate station set designs which may be more economical in view of the lesser range of energizing current operating requirements.

One of the components so far not previously mentioned is resistor 178a shown in FIG. 7 as being optionally connectable between the receive lead and the input of the amplifier 190. The resistor is of no advantage other than that of altering the response of the equalization circuit somewhat deleteriously so that the line interface is limited in function to meet the present L.S.S.G.R. standard specification. In the operation of the equalization circuit, the inclusion of this resistor also causes reduction of those signal components from the receive lead and which thus appear on the transmit lead. Therefor this option is deleterious to operation of an associated hybrid circuit.

Resistance values matched to within 1% of each other are indicated in the following table by showing the identifying labels on the same line together.

It should be understood that the below listed values were found to be satisfactory in prototype examples of the line interface circuit. However, it is expected that the most practical embodiments will for the most part be manifest in integrated circuit form, with the possible exceptions of the resistance network or networks and some capacitive elements. In such integrated circuit form, it may be that various of the circuit element values are changed for convenience.

| TABLE OF TYPICAL COMPONENT VALUES | |
| --- | --- |
| Component | Value in Ohms |
| 12 and 13 | 100 |
| 14a and 14b, 15a and 15b | 200K |
| 18 and 19 | 100 |
| 112 and 113 | 100 |
| 114a and 114b, 115a and 115b | 200K |
| 133 | 100 |
| 135 | 100 |
| 137 | 100K |
| 143 | 100 |
| 145 | 100 |
| 147 | 100K |
| 152 | 5.62K |
| 153 | 5.11K |
| 154 | 20K |
| 162 | 20K |
| 163 | 200K |
| 164 | 3M |
| 167 | 357K |
| 169a | 100K |
| 172 | 100K |
| 173a | 100K |
| 173b | 100K |
| 173c | 100K |
| 177 | 100K |
| 178 | 100K |
| 178a | 100K |
| 179 | 51.1K |
| 181 | 100K |
| 183 | 100K |
| 184 | 100K |
| 185 | 100K |
| 187a | 100K |
| 187b | 100K |
| 188 | 100K |
| 189a | 100K |
| 191 | 33K |
| 192 | 100K |
| 193a | 200K |
| 193b | 200K |
| 196r | 10K |
| 213 | 20 |
| 214 | 100K |
| 215 | 47K |
| 216 | 200K |
| 217 | 200K |
| 223 | 20 |
| 224 | 100K |
| 225 | 47K |
| 226 | 200K |
| 227 | 200K |
| 232, 233 | 200K |
| 234, 235 | 200K |
| 236 | 200K |
| 242 | 100K |
| 244 | 33K |
| 245 | 100K |
| | Value in Nanofarads |
| 169b | 6.6 |
| 196c | 50 |
| 218 | 470 |
| 228 | 470 |
| 237 and 238 | 100 |

What is claimed is:

1. A line circuit for interfacing tip and ring leads of a telephone line with a telephone facility, comprising:
   tip and ring terminals for connection to the tip and ring leads;
   an a.c. signal feed termination, including active impedance tip and ring means, for coupling substantially only alternating current signals between the tip and ring terminals and the telephone facility;
   a direct current feed termination, including active resistance tip and ring means, for valving substantially only direct current via the tip and ring terminals;
   a resistance network including, a tip feed resistor connected to the tip terminal, the active impedance tip means and the active resistance tip means, a ring feed resistor connected to the ring terminal, the active impedance ring means and the active resistance ring means, and tip and ring voltage dividers having tip and ring voltage taps each being connected to an input of the a.c. signals feed termination.

2. A line circuit for interfacing tip and ring leads of a telephone line with a telephone facility, comprising:
   a direct current feed termination for valving substantially only direct current via the telephone line;
   a primary resistance network including primary tip and ring feed resistors for connection between tip and ring leads of the telephone line and direct current feed termination;
   an a.c. signal feed termination for coupling substantially only alternating current signals between the telephone line and the telephone facility;
   a secondary resistance network including secondary tip and ring feed resistors being connected between the a.c. signal feed termination and respective ones of the primary tip and ring feed resistors, and the secondary resistance network further including secondary tip and ring voltage dividers having tip and ring taps being connected to a differential input of the a.c. signal feed termination;
   whereby in operation the primary tip and ring feed resistors carry all of the current traversing the telephone line while the secondary tip and ring feed resistors are limited to a.c. current components traversing the telephone line to the exclusion of direct current.

3. A line interface circuit, for interfacing a telephone line and a telephone facility, comprising:
   tip and ring terminals for connection to tip and ring leads of the telephone line;
   a direct current feed termination, including active resistance tip and ring means, for valving energizing direct current via the telephone line tip and ring terminals, and a current limiting means whereby the energizing direct current is restrained from exceeding a predetermined limit;
   an a.c. signal feed termination including active impedance tip and ring means, for coupling a.c. signals between the tip and ring terminals and the telephone facility, an equalization means being responsive to a restraint of the characteristics of the a.c. signal feed termination accordingly; and
   a resistance network including, a tip feed resistor connected between the tip terminal and each of the active tip means, a ring feed resistor connected between the ring terminal and each of the active ring means, and tip and ring voltage dividers having tip and ring voltage taps connected to an input of the a.c. signals feed termination.

4. A line interface circuit as defined in claim 3, wherein the equalization circuit comprises:
   a receive lead for receiving a.c. signals from the telephone facility;
   a transmit lead for transmitting a.c. signals to the telephone facility;
   amplifier means being responsive to any a.c. receive signals on the receive lead and any differentially sensed line signals for generating a transmit signal on the transmit lead;

ring and tip drive amplifiers being responsive to the transmit signal for generating non-inverted and inverted signals for driving tip and ring amplifiers; and variable attenuation means being responsive to a restraint of the energizing direct current for altering response of the tip and ring drive amplifiers whereby an effective a.c. terminating impedance of the line interface circuit is adjusted.

5. A line interface circuit as defined in claim 4, further comprising:

switch means for selecting an operating gain of said tip and ring drive amplifiers whereby more than one predetermined effective terminating impedance is selectable for terminating the communication line.

6. A line interface circuit as defined in claim 4, further comprising:

an amplifier for coupling said differentially sensed line signals with either of at least two selectable gain factors whereby the line interface circuit is adapted to receive said line signals from a communication line of either of more than one predetermined characteristic impedance.

7. A line interface circuit as defined in claim 4, wherein the variable attenuator means also reduces response of the amplifying means to the differentially sensed line signals, to the exclusion of the a.c. receive signals, in response to restraint of the energizing direct current.

8. A line interface circuit as defined in claim 7, further comprising:

an amplifier for coupling said differentially sensed line signals with either of at least two selectable gain factors whereby the line interface circuit is adapted to receive said line signals from a communication line of either of more than one predetermined characteristic impedance.

9. A line interface circuit as defined in claim 7, further comprising:

switch means for selecting an operating gain of said tip and ring drive amplifiers whereby more than one predetermined effective terminating impedance is selectable for terminating the communication line.

10. A line interface circuit for supplying energizing current for operation of a two wire communication line and for coupling a.c. signals between the communications line and a telephone facility, comprising:

tip and ring terminals for connection to the communications line;

ground and battery terminals for connection to a source of energizing direct current;

tip and ring rails;

a resistance network including tip and ring feed resistors being connected between the tip and ring terminals and the tip and ring rails respectively, a tip voltage divider being connected between the tip rail and the ring terminal and including a tip tap, and a ring voltage divider being connected between the ring rail and the tip terminal and including a ring tap;

a.c. signals coupling means including tip and ring active impedance feed means being connected to the tip and ring rails respectively, a differential amplifier circuit having inputs connected to the tip and ring taps and having an output for providing a.c. signals, in response to differential signals on the communication line, for operation of the tip and ring active impedance feed means, the a.c. signals coupling means, each having an output being operable for coupling a.c. signals between the communication line and the telephone facility;

a direct current feed means including, tip and ring active resistance valving means for conducting energizing direct currents between the ground and power terminals and the tip and ring rails, wherein one of said valving means is operative to conduct at a predetermined resistance and the other of said valving means is operative to conduct at a resistance which maintains a voltage difference across said other valving means similar to a voltage difference across said one valving means.

11. A line interface circuit as defined in claim 10, wherein the direct current feed means further includes:

a rail tap means for providing a rail tap voltage about midway between voltages at the tip and ring rails;

a power tap means for providing a power tap voltage about midway between voltages at the ground and power terminals;

control means being responsive to the rail and power tap voltages for generating a current control signal to which said other valving means is responsive for regulating said voltage difference.

12. A line interface circuit as defined in claim 10, wherein the direct current feed means further includes:

a current limit control circuit for generating a current limit signal to which said one active resistance valving means is responsive for increasing said resistance to be greater than said predetermined resistance, in an event wherein said energizing current corresponds to a predetermined limit.

13. A line interface circuit as defined in claim 10, wherein the direct current feed means further includes:

a rail tap means for providing a rail tap voltage about midway between voltages at the tip and ring rails;

a power tap means for providing a power tap voltage about midway between voltages at the ground and power terminals;

control means being responsive to the rail and power tap voltages for generating a current control signal to which said other valving means is responsive for regulating said voltage difference; and a current limit control circuit for generating a current limit signal to which said one valving means is responsive for increasing said resistance to be greater than said predetermined resistance, in an event wherein said energizing current corresponds to a predetermined limit.

14. A line interface circuit for supplying energizing current for operation of a two wire communication line and for coupling a.c. signals between the communications line and a telephone facility, comprising:

tip and ring terminals for connection to the communications line;

ground and battery terminals for connection to a source of energizing direct current;

tip and ring rails;

a resistance network including tip and ring feed resistors being connected between the tip and ring terminals and the tip and ring rails respectively, a tip voltage divider being connected between the tip rail and the ring terminal and including a tip tap, and a ring voltage divider being connected between the ring rail and the tip terminal and including a ring tap;

a.c. signals coupling means including tip and ring active impedance feed means being connected to the tip and ring rails respectively, a differential amplifier circuit having inputs connected to the tip and ring taps and having an output for providing a.c. signals, in response to differential signals on the communication line, for operation of the tip and ring active impedance feed means, the a.c. signals coupling means being operable for coupling a.c. signals between the communications line and the telephone facility;

a direct current feed means including, tip and ring active resistance valving means for conducting energizing direct currents between the ground and power terminals and the tip and ring rails, wherein one of said valving means is operative to conduct at a predetermined resistance and the other of said valving means is operative to conduct at a resistance which maintains a voltage difference across said other valving means similar to a voltage difference across said one valving means;

and each of the tip and ring active resistance valving means comprising:

a current feed resistor being connected to a respective one of the power and ground terminals;

a voltage follower circuit including an input and a transistor having an emitter electrode connected to the current feed resistor and a collector electrode connected to a respective one of the tip and ring rails;

a direct current voltage divider including resistive elements being connected between said respective terminal and rail and defining first and second voltage taps, the first voltage tap being resistively closer to the terminal than the second voltage tap, the input of the voltage follower circuit being connected to the first voltage tap, resistance values of the resistance elements in the direct current voltage divider being such that the transistor is normally operated near a saturation mode of operation;

one of the tip and ring active resistance valving means further comprising;

a current limit control circuit being connected to the first voltage tap and including a non linear conductive device for limiting a voltage difference between said terminal and the first voltage tap whereby the transistor may be operated in a mode substantially remote from said saturation mode of operation; and the other of the tip and ring active resistance valving means further comprising:

a rail voltage divider being connected between the tip and ring rails and including a rail tap;

a power voltage divider being connected between the ground and power terminals and including a power tap;

a differential amplifier having inputs connected across the rail and power taps and an output connected to the second voltage tap of the direct current voltage divider, for causing said other active resistance valving means to mimic operation of said one active resistance valving means.

15. A line interface circuit as defined in claim 10, wherein the a.c. signals coupling means further comprises:

a transformer including, a tip primary winding being connected between the tip rail and a junction associated with the output of the tip active impedance feed means, a ring primary winding being connected between the ring rail and a junction associated with the output of the ring active impedance feed means, and a secondary winding for connection to the telephone facility:

a coupling network for coupling a.c. signals from the output of the differential amplifier circuit to the tip active impedance feed means, for coupling an inverted replica of the a.c. signals to the ring active impedance feed means, and including a reactive network for defining a nominal effective impedance at each of said junctions; and wherein the tip active impedance feed means includes a differential amplifier having an inverting input and an output connected to said junction, and a non-inverting input being connected to the coupling network for receiving said a.c. signals; and wherein the ring active impedance feed means includes a differential amplifier having an inverting input and an output connected to said junction, and a non-inverting input being connected to the coupling network for receiving said replica signals.

16. A line interface circuit as defined in claim 15, further comprising an equalization circuit means within the coupling network, the equalization circuit means being responsive to a current limiting occurrence in one of the direct current feed means for modifying a function of the coupling network.

17. A line interface circuit a defined in claim 15, wherein the direct current feed means further includes:

a rail tap means for providing a rail tap voltage about midway between voltages at the tip and ring rails;

a power tap means for providing a power tap voltage about midway between voltages at the ground and power terminals;

control means being responsive to the rail and power tap voltages for generating a current control signal to which said other valving means is responsive for regulating said voltage difference.

18. A line interface circuit as defined in claim 15, wherein the direct current feed means further includes:

a current limit control circuit for generating a current limit signal to which said one active resistance valving means is responsive for increasing said resistance to be greater than said predetermined resistance, in an event wherein said energizing current corresponds to a predetermined limit.

19. A line interface circuit as defined in claim 15, wherein the direct current feed means further includes:

a rail tap means for providing a rail tap voltage about midway between voltages at the tip and ring rails;

a power tap means for providing a power tap voltage about midway between voltages at the ground and power terminals;

control means being responsive to the rail and power tap voltages for generating a current control signal to which said other valving means is responsive for regulating said voltage difference; and a current limit control circuit for generating a current limit signal to which said one valving means is responsive for increasing said resistance to be greater than said predetermined resistance, in an event wherein said energizing current corresponds to a predetermined limit.

20. A line interface circuit as defined in claim 15, wherein the tip and ring active resistance valving means each comprises:
- a current feed resistor being connected to a respective one of the power and ground terminals;
- a voltage follower circuit including an input and a transistor having an emitter electrode connected to the current feed resistor and a collector electrode connected to a respective one of the tip and ring rails;
- a direct current voltage divider including resistive elements being connected between said respective terminal and rail and defining first and second voltage taps, the first voltage tap being resistively closer to the terminal than the second voltage tap, the input of the voltage follower circuit being connected to the first voltage tap, resistance values of the resistance elements in the direct current voltage divider being such that the transistor is normally operated near a saturation mode of operation; and wherein one of the tip and ring active resistance valving means further comprises;
- a current limit control circuit being connected to the first voltage tap and including a non linear conductive device for limiting a voltage difference between said terminal and the first voltage tap whereby the transistor may be operated in a mode substantially remote from said saturation mode of operation; and wherein the other of the tip and ring active resistance valving means further comprises:
- a rail voltage divider being connected between the tip and ring rails and including a rail tap;
- a power voltage divider being connected between the ground and power terminals and including a power tap;
- a differential amplifier having inputs connected across the rail and power taps and an output connected to the second voltage tap of the direct current voltage divider, for causing said other active resistance valving means to mimic operation of said one active resistance valving means.

21. A line interface circuit as defined in claim 20, further comprising an equalization circuit, for changing the effective operating impedance at said junction in response to active current limiting of the energizing current.

22. A line interface circuit as defined in claim 20, further comprising an equalization circuit, within the coupling network, for changing the effective operating attenuation at said junction in response to active current limiting of the energizing current.

23. A line interface circuit for terminating a two wire communication line and for coupling a.c. signals between the communication line and a telephone facility, the line interface circuit comprising:
- tip and ring terminals for connection to the communication line;
- ground and battery terminals for connection to a source of energizing power;
- primary tip and ring rails;
- a primary resistance network including primary tip and ring feed resistors being connected between the tip and ring terminals and the primary tip and ring rails respectively, and primary tip and ring taps within primary tip and ring voltage dividers;
- a primary differential amplifier circuit including inputs connecting the primary tip and ring taps, and an output, the primary differential amplifier circuit being responsive to potentials appearing at the primary tip and ring taps for generating supervisory signals for use in the telephone facility;
- a direct current feed means including, tip and ring active resistance valving means for conducting energizing direct currents between the ground and power terminals and the primary tip and ring rails, wherein one of said valving means is operative to conduct at a predetermined resistance and the other of said valving means is operative to conduct at a resistance which maintains a voltage difference across said other valving means similar to a voltage difference across said one valving means;
- secondary tip and ring rails;
- a secondary resistance network including secondary tip and ring feed resistors being connected between the respective secondary tip and ring rails and the primary tip and ring rails, and secondary tip and ring taps within secondary tip and ring voltage dividers; and
- a.c. signals coupling means including tip and ring active impedance feed means being connected to the secondary tip and ring rails respectively, a differential amplifier circuit having inputs connected to the secondary tip and ring taps and having an output for providing a.c. signals, in response to differential signals on the communication line, for operation of the tip and ring active impedance feed means, the a.c. signals coupling means being operable for coupling a.c. signals between the communication line and the telephone facility.

24. A line interface circuit as defined in claim 23, wherein the direct current feed means further includes:
- a primary rail tap means for providing a rail tap voltage about midway between voltages at the primary tip and ring rails;
- a power tap means for providing a power tap voltage about midway between voltages at the ground and power terminals;
- control means being responsive to the rail and power tap voltages for generating a current control signal to which said other valving means is responsive for regulating said voltage difference.

25. A line interface circuit as defined in claim 23, wherein the direct current feed means further includes:
- a current limit control circuit for generating a current limit signal to which said one active resistance valving means is responsive for increasing said resistance to be greater than said predetermined resistance, in an event wherein said energizing current corresponds to a predetermined limit.

26. A line interface circuit as defined in claim 23, wherein the direct current feed means further includes:
- a primary rail tap means for providing a rail tap voltage about midway between voltages at the primary tip and ring rails;
- a power tap means for providing a power tap voltage about midway between voltages at the ground and power terminals;
- control means being responsive to the rail and power tap voltages for generating a current control signal to which said other valving means is responsive for regulating said voltage difference; and
- a current limit control circuit for generating a current limit signal to which said one valving means is responsive for increasing said resistance to be greater than said predetermined resistance, in an event wherein said energizing current corresponds to a predetermined limit.

27. A line interface circuit as defined in claim 23, wherein each one of the tip and ring active resistance valving means comprises:
a current feed resistor being connected to a respective one of the power and ground terminals;
a voltage follower circuit including an input and a transistor having an emitter electrode connected to the current feed resistor and a collector electrode connected to a respective one of the primary tip and ring rails;
a direct current voltage divider including resistive elements being connected between said respective terminal and rail and defining first and second voltage taps, the first voltage tap being resistively closer to the terminal than the second voltage tap, the input of the voltage follower circuit being connected to the first voltage tap, resistance values of the resistance elements in the direct current voltage divider being such that the transistor is normally operated near a saturation mode of operation; and
wherein one of the tip and ring active resistance valving means further comprises;
a current limit control circuit being connected to the first voltage tap and including a non linear conductive device for limiting a voltage difference between said terminal and the first voltage tap whereby the transistor may be operated in a mode substantially remote from said saturation mode of operation; and
wherein the other of the tip and ring active resistance valving means further comprises:
a differential amplifier having inputs connected across the rail and power taps and an output connected to the second voltage tap of the direct current voltage divider, for causing said other active resistance valving means to mimic operation of said one active resistance valving means;
a rail voltage divider being connected between the primary tip and ring rails and including a rail tap;
a power voltage divider being connected between the ground and power terminals and including a power tap;
a differential amplifier having inputs connected across the rail and power taps and an output connected to the second voltage tap of the direct current voltage divider, for causing said other active resistance valving means to mimic operation of said one active resistance valving means.

28. A line interface circuit, for terminating a two wire communication line and for coupling a.c. signals between the communication line and a hybrid circuit, the line interface circuit comprising:
tip and ring terminals for connection to the communication line;
ground and battery terminals for connection to a source of energizing power;
tip and ring rails;
a resistance network including tip and ring feed resistors being connected between the tip and ring terminals and the respective tip and ring rails, and tip and ring taps within tip and ring voltage dividers;
a differential amplifier circuit including inputs connected to the tip and ring taps, and an output;
an a.c. feedback path connected between the output and an inverting input of the differential amplifier circuit;
tip and ring amplifiers each having an input and an output;
a transformer including tip and ring primary windings and a secondary winding, the tip primary winding being connected between the tip rail and the output of the tip amplifier, the ring primary winding being connected between the ring rail and the output of the ring amplifier, and the secondary winding being for connection to the hybrid circuit;
a coupling network for coupling a.c. signals from the output of the differential amplifier circuit to the input of one of the tip and ring amplifiers and for coupling an inverted replica of said a.c. signals to the input of the other of the tip and ring amplifiers;
tip and ring direct current valving means for conducting energizing direct current between the ground and power terminals and the respective tip and ring rails, while substantially excluding conduction of currents in association with any differential a.c. voltages appearing on the tip and ring rails; and
d.c. control means for restricting conductance of current flow through the tip and ring direct current valving means.

29. A line interface circuit comprising:
a direct current feed termination for valving energizing direct current via a telephone line and including a current limiting means whereby the energizing direct current is restrained from exceeding a predetermined limit;
a primary resistance network including primary tip and ring feed resistors for connection between tip and ring leads of the telephone line and the direct current feed termination;
an a.c. signal feed termination for coupling a.c. signals between the telephone line and a telephone facility, the a.c. signal feed termination including an equalization means being responsive to a restraint of the energizing direct current for varying gain and impedance characteristics of the a.c. signal feed termination accordingly;
a secondary resistance network including secondary tip and ring feed resistors being connected between the a.c. signal feed termination and respective ones of the primary tip and ring feed resistors, and the secondary resistance network further including secondary tip and ring voltage dividers having tip and ring taps being connected to a differential input of the a.c. signal feed termination;
whereby in operation the primary tip and ring feed resistors carry all of the current traversing the telephone line while the secondary tip and ring feed resistors are limited to a.c. current components traversing the telephone line to the exclusion of direct current.

30. A line interface circuit as defined in claim 29, wherein the equalization circuit comprises:
a receive lead for receiving a.c. signals from the telephone facility;
a transmit lead for transmitting a.c. signals to the telephone facility;
amplifier means being responsive to any a.c. receive signals on the receive lead and any differentially sensed line signals for generating a transmit signal on the transmit lead;
ring and tip drive amplifiers being responsive to the transmit signal for generating non-inverted and inverted signals for driving tip and ring amplifiers; and variable attenuation means being responsive to a restraint of the energizing direct current for altering response of the tip and ring drive amplifiers whereby an effective a.c. terminating impedance of the line interface circuit is adjusted at outputs of the tip and ring amplifiers.

31. A line interface circuit as defined in claim 30, wherein the variable attenuator means also reduces response of the amplifying means to the differentially sensed line signals, to the exclusion of the a.c. receive signals, in response to restraint of the energizing direct current.

32. A method for interfacing a two wire communication line and a telecommunication facility comprising:

providing a resistance network including tip and ring feed resistors and tip and ring taps on tip and ring voltage dividers;

valving energizing direct current, to the substantial exclusion of differential alternating currents, through the communication line via a valving means and the tip and ring feed resistors;

coupling signal representation of signals appearing at the tip and ring taps to the telecommunications facility; and feeding the communications line differentially in antiphase in response to substantially only differential a.c. signals appearing at the tip and ring taps and feeding the communication line differentially in response to a.c. signals from the telecommunications facility via a feed means, whereby the communications line is terminated with an a.c. impedance being substantially independent of a resistance associated with the valving of the energizing direct current.

33. A method as defined in claim 32 where in an instance of said communication line being of less than a predetermined resistance to a flow of the energizing direct current:

the resistance associated with the valving of the direct energizing current is increased to effect an upper limit of the energizing current flow; and the differential feeding of the communication line is varied to become simultaneously more responsive to the a.c. signals appearing at the tip and ring taps and less responsive to the a.c. signals from the telecommunications facility, the variation progressing in relation to the amount of increase of said resistance associated with the valving of the energizing direct current.

34. A method for interfacing a two wire communication line and a telecommunications facility comprising:

providing primary and secondary resistance networks, each including tip and ring feed resistors and tip and ring taps in tip and ring voltage dividers, the tip feed resistors being connected in series and the ring feed resistors being connected in series respectively;

valving energizing direct current through the communication line via a resistive feed means and the tip and ring feed resistors of the primary resistance network;

coupling signal representation of signals appearing at the tip and ring taps of the secondary resistance network to the telecommunications facility, and in response to differential a.c. signals appearing at the tip and ring taps of the secondary resistance network and a.c. signals from the telecommunication facility, feeding the communication line differentially in antiphase with respect to said appearing a.c. signals, whereby the communication line is terminated with an a.c. impedance being substantially independent of a resistance associated with the feeding of the direct energizing current.

35. A method as defined in claim 34, where in an instance of said communication line being of less than a predetermined resistance to a flow of the energizing direct current:

the resistance associated with the valving of the direct energizing current is increased to effect an upper limit of the energizing current flow; and the differential feeding of the communication line is varied to become simultaneously more responsive to the a.c. signals appearing at the tip and ring taps and less responsive to the a.c. signals from the telecommunications facility, the variation progressing in relation to the amount of increase of said resistance associated with the valving of the energizing direct current.

36. A line interface circuit for coupling a.c. signals between a communication line and an associated telephony facility, including;

tip and ring amplifiers being operable for terminating the communication line with a predetermined impedance in response to differential alternating currents in the communication line, and a current limiting device being operable to limit energizing direct current flow in the communication line in an instance wherein said flow would otherwise exceed a predetermined limit, the line interface circuit being characterized by:

an equalization circuit, being responsive to an instance of said current limiting for modifying said response to said differential alternating currents whereby the terminating impedance is varied from said predetermined impedance.

37. A line interface circuit as defined in claim 36, wherein the equalization circuit includes means for increasing alternating current antiphase drive of the communication line via the tip and ring amplifiers during said instance of current limiting.

38. A method for terminating tip and ring leads of a two-wire communication line comprising the steps of:

(a) providing a resistance network including tip and ring resistors being connecting in series between the tip and ring rails, and including tip and ring taps in tip and ring voltage dividers;

(b) valving energizing direct current flows, to exclude differential alternating current, via a battery supply, valving means, the tip and ring rails, resistors and the tip and ring leads; and (c) actively terminating the tip and ring rails with an impedance being less than a characteristic impedance of the communication line by an amount corresponding to a sum of the ohmic values of the tip and ring resistors, via a feed means, in response to differential voltages developed at the tip and ring taps in response to differential currents in the tip and ring resistors.

39. A method as defined in claim 38, further comprising the step of:

(e) varying the valving of the energizing direct current flows in proportion to a longitudinal signal on the communication line, whereby corresponding longitudinal voltage on the tip and ring rails is reduced.

40. A method for terminating first and second leads of a two-wire communication line comprising the steps of:
  (a) providing a primary resistance network including primary tip and ring resistors being connected in series between the first and second leads and primary tip and ring rails, and including primary tip and ring taps in primary tip and ring voltage dividers;
  (b) providing a secondary resistance network including secondary tip and ring resistors being connected in series between the primary tip and ring rails and secondary tip and ring rails, and including secondary tip and ring taps in secondary tip and ring voltage dividers;
  (c) valving energized direct current flows, to exclusion of differential alternating current, via the primary tip and ring rails and resistors and the first and second leads; and
  (d) actively terminating the secondary tip and ring rails with an impedance being less than a characteristic impedance of the communication line by an amount corresponding to a sum of the ohmic values of the primary and secondary tip and ring resistors, in response to differential voltages developed at the secondary tip and ring taps in response to differential currents in the secondary tip and ring resistors.

41. A method as defined in claim 40, further comprising the step of:
  (f) varying the valving of the energizing direct current flows in proportion to a longitudinal signal on the communication line, whereby corresponding longitudinal voltage on the primary tip and ring rails is reduced.

42. A line interface circuit for terminating a two wire communication line and for coupling a.c. signals between the communication line and a hybrid circuit, the line interface circuit comprising:
  tip and ring terminals for connection to the communication line;
  ground and battery terminals for connection to a source of energizing power;
  primary tip and ring rails;
  a primary resistance network including tip and ring feed resistors being connected between the tip and ring terminals and the respective primary tip and ring rails, and primary tip and ring taps within primary tip and ring voltage dividers;
  a primary differential amplifier circuit including inputs connecting the primary tip and ring taps, and an output, the primary differential amplifier circuit being responsive to potentials appearing at the primary tip and ring taps for generating supervisory signals;
  tip and ring direct current valving means for conducting energizing direct current between the ground and power terminals and the respective primary tip and ring rails, while substantially excluding conduction of currents in association with any differential a.c. voltages appearing on the primary tip and ring rails;
  d.c. control means for restricting conductance of current flows through the tip and ring valving means;
  secondary tip and ring rails;
  a secondary resistance network including secondary tip and ring feed resistors being connected between the respective secondary tip and ring rails and the primary tip and ring rails, and secondary tip and ring taps within secondary tip and ring voltage dividers;
  a secondary differential amplifier circuit including inputs connected to the secondary tip and ring taps, a feedback network having a.c. and d.c. feedback paths, one of said inputs being for connection to the hybrid circuit and an output for connection to the hybrid circuit;
  tip and ring amplifiers each having an input and an output, the output being connected to a respective one of the secondary tip or ring rails; and
  a coupling network for coupling a.c. signals from the output of the secondary differential amplifier to the input of one of the tip and ring amplifiers and for coupling an inverted replica of said a.c. signals to the input of the other tip and ring amplifier.

43. A line interface circuit as defined in claim 42, wherein the output of the tip amplifier is resistively connected to the secondary tip rail and an inverting input of the tip amplifier, and wherein the output of the ring amplifier is resistively connected to the secondary ring rail and an inverting input of the ring amplifier.

* * * * *